US008711849B2

(12) United States Patent
Siu et al.

(10) Patent No.: US 8,711,849 B2
(45) Date of Patent: Apr. 29, 2014

(54) OUTPUT QUEUED SWITCH WITH A PARALLEL SHARED MEMORY, AND METHOD OF OPERATING SAME

(75) Inventors: Kai-Yeung (Sunny) Siu, San Jose, CA (US); Brian Hang Wai Yang, Monterey Park, CA (US); Mizanur M. Rahman, Cupertino, CA (US)

(73) Assignee: NetLogic Microsystems, Inc., Irvine, CA (US)

( * ) Notice: Subject to any disclaimer, the term of this patent is extended or adjusted under 35 U.S.C. 154(b) by 396 days.

(21) Appl. No.: 12/946,780

(22) Filed: Nov. 15, 2010

(65) Prior Publication Data

US 2011/0085553 A1    Apr. 14, 2011

Related U.S. Application Data

(63) Continuation of application No. 12/198,776, filed on Aug. 26, 2008, now Pat. No. 7,835,334, which is a continuation of application No. 09/939,454, filed on Aug. 24, 2001, now Pat. No. 7,420,969.

(60) Provisional application No. 60/302,775, filed on Jul. 3, 2001, provisional application No. 60/253,801, filed on Nov. 29, 2000.

(51) Int. Cl.
*H04L 12/50* (2006.01)
*H04Q 3/68* (2006.01)

(52) U.S. Cl.
CPC ..................................... *H04Q 3/68* (2013.01)
USPC .......................................................... 370/388

(58) Field of Classification Search
USPC ........... 370/228, 231, 236.1, 388, 390, 395.1, 370/395.32, 395.42, 396, 398, 428–429
See application file for complete search history.

(56) References Cited

U.S. PATENT DOCUMENTS

| 5,285,444 | A   | * | 2/1994  | Sakurai et al.    | 370/396   |
|-----------|-----|---|---------|-------------------|-----------|
| 5,896,380 | A   | * | 4/1999  | Brown et al.      | 370/388   |
| 6,122,279 | A   | * | 9/2000  | Milway et al.     | 370/395.32|
| 6,449,405 | B1  | * | 9/2002  | Paniccia et al.   | 385/16    |
| 6,473,428 | B1  | * | 10/2002 | Nichols et al.    | 370/395.1 |
| 6,570,894 | B2  | * | 5/2003  | Anderson          | 372/32    |
| 6,580,721 | B1  | * | 6/2003  | Beshai            | 370/428   |

(Continued)

*Primary Examiner* — Phuongchau B Nguyen
(74) *Attorney, Agent, or Firm* — Sterne, Kessler, Goldstein & Fox PLLC

(57) ABSTRACT

A network switch includes an input layer to receive a data stream with a set of cells. Each cell includes data and a header to designate a destination device. The input layer includes a set of input layer circuits. A selected input layer circuit of the set of input layer circuits receives the data stream. The selected input layer circuit includes a set of queues corresponding to a set of destination devices. The selected input layer circuit is configured to assign a selected cell from the data stream to a selected queue of the set of queues. The selected queue corresponds to a selected destination device specified by the header of the selected cell. An intermediate layer includes a set of intermediate layer circuits, each intermediate layer circuit has a set of buffers corresponding to the set of destination devices. A selected intermediate layer circuit of the set of intermediate layer circuits receives the selected cell and assigns the selected cell to a selected buffer corresponding to the selected destination device. An output layer includes a set of output layer circuits corresponding to the set of destination devices. A selected output layer circuit of the set of output layer circuits stores the selected cell prior to routing the selected cell to a selected output layer circuit output node.

20 Claims, 10 Drawing Sheets

(56) References Cited

U.S. PATENT DOCUMENTS 6,661,773 B1 * 12/2003 Pelissier et al. ............... 370/228
6,751,219 B1 * 6/2004 Lipp et al. ..................... 370/390
7,420,969 B2 * 9/2008 Siu et al. ....................... 370/388
7,835,334 B2 * 11/2010 Siu et al. ....................... 370/338

\* cited by examiner

OUTPUT QUEUED SWITCH WITH A PARALLEL SHARED MEMORY, AND METHOD OF OPERATING SAME

RELATED APPLICATIONS

The present application is a continuation of U.S. application Ser. No. 12/198,776, filed on Aug. 26, 2008, which is a continuation of U.S. application Ser. No. 09/939,454, filed on Aug. 24, 2001, which claims priority to U.S. Provisional Application No. 60/302,775, filed on Jul. 3, 2001 and U.S. Provisional Application No. 60/253,801, filed on Nov. 29, 2000, which are all incorporated herein by reference in their entirety.

BRIEF DESCRIPTION OF THE INVENTION

This invention relates generally to high bandwidth data communications through computer networks. More particularly, this invention relates to an output queued switch with a parallel shared memory.

BACKGROUND OF THE INVENTION

As computer network traffic increases, there are ongoing demands for improved network communication and switching. The advent of optical communication links has accelerated the need for ultra-fast network switching technologies.

There are many switching fabrics available in the market today that can provide switching bandwidth from 250 Gbps to 512 Gbps. Most of these switching fabrics are crossbar architectures that can scale up to a couple of Tbps. Unfortunately, it is difficult to obtain bandwidths higher than this in view of the complexity associated with a centralized arbitration and scheduling algorithm. Furthermore, implementations of conventional crossbar architectures require relatively large chip counts, resulting in relatively expensive systems. While packet switch techniques have been suggested, proposed designs have not been sufficiently robust to accommodate high-speed requirements.

In view of the foregoing, it would be highly desirable to provide an improved switching fabric. In particular, it would be highly desirable to provide a switching fabric that is readily scalable with relatively low chip counts to achieve high Tbps speeds.

SUMMARY OF THE INVENTION

The invention includes a network switch apparatus with an input layer to receive a data stream containing a set of cells. Each cell includes data and a header to designate a destination device. The input layer includes a set of input layer circuits. A selected input layer circuit of the set of input layer circuits receives the data stream. The selected input layer circuit includes a set of queues corresponding to a set of destination devices. The selected input layer circuit is configured to assign a selected cell from the data stream to a selected queue of the set of queues. The selected queue corresponds to a selected destination device specified by the header of the selected cell. An intermediate layer includes a set of intermediate layer circuits, each intermediate layer circuit has a set of buffers corresponding to the set of destination devices. A selected intermediate layer circuit of the set of intermediate layer circuits receives the selected cell and assigns the selected cell to a selected buffer corresponding to the selected destination device. An output layer includes a set of output layer circuits corresponding to the set of destination devices. A selected output layer circuit of the set of output layer circuits stores the selected cell prior to routing the selected cell to a selected output layer circuit output node.

The invention also includes a method of routing network traffic. The method includes receiving a data stream with a set of cells, each cell including data and a header to designate a destination device. A selected cell of the set of cells is assigned to a selected queue of a set of queues within an input layer circuit. The selected cell specifies a selected destination device. The selected queue corresponds to the selected destination device. The selected cell is routed to a selected intermediate layer circuit within a set of intermediate layer circuits. The selected intermediate layer circuit includes a set of buffers corresponding to a set of destination devices. The selected intermediate layer circuit assigns the selected cell to a selected buffer of the set of buffers. The selected buffer corresponds to the selected destination device. The selected cell is then sent to a selected output layer circuit within a set of output layer circuits. The selected output layer circuit corresponds to the selected destination device. The selected output layer circuit stores the selected cell prior to delivering the selected cell to an output node.

Advantages of the invention include high speed, versatility, high efficiency and a relatively low chip count. Additionally, the invention includes optional features, such as Quality of Service, fault tolerance and the ability to manage a number of different communication protocols, including Internet Protocol (IP), Time-Division Multiplexed (TDM), Asynchronous Transport Mode (ATM) and others.

BRIEF DESCRIPTION OF THE FIGURES

The invention is described with reference to the Figures, in which.

Identical reference numbers in the figures refer to identical elements in the drawings.

DETAILED DESCRIPTION OF THE INVENTION

The invention is described with reference to specific architectures and protocols. This description is for illustration and to otherwise demonstrate a mode of practicing the invention. This description is not meant to be limiting. For example, reference is made to Internet Protocol, but any packet protocol is applicable. Moreover, reference is made to chips that contain integrated circuits, while other hybrid or meta-circuits combining those described in chip form are also contemplated. The exemplary embodiment is provided for a switch where N is 48, but could be any other number consistent with switch technology (e.g., 64).

Figure 1:
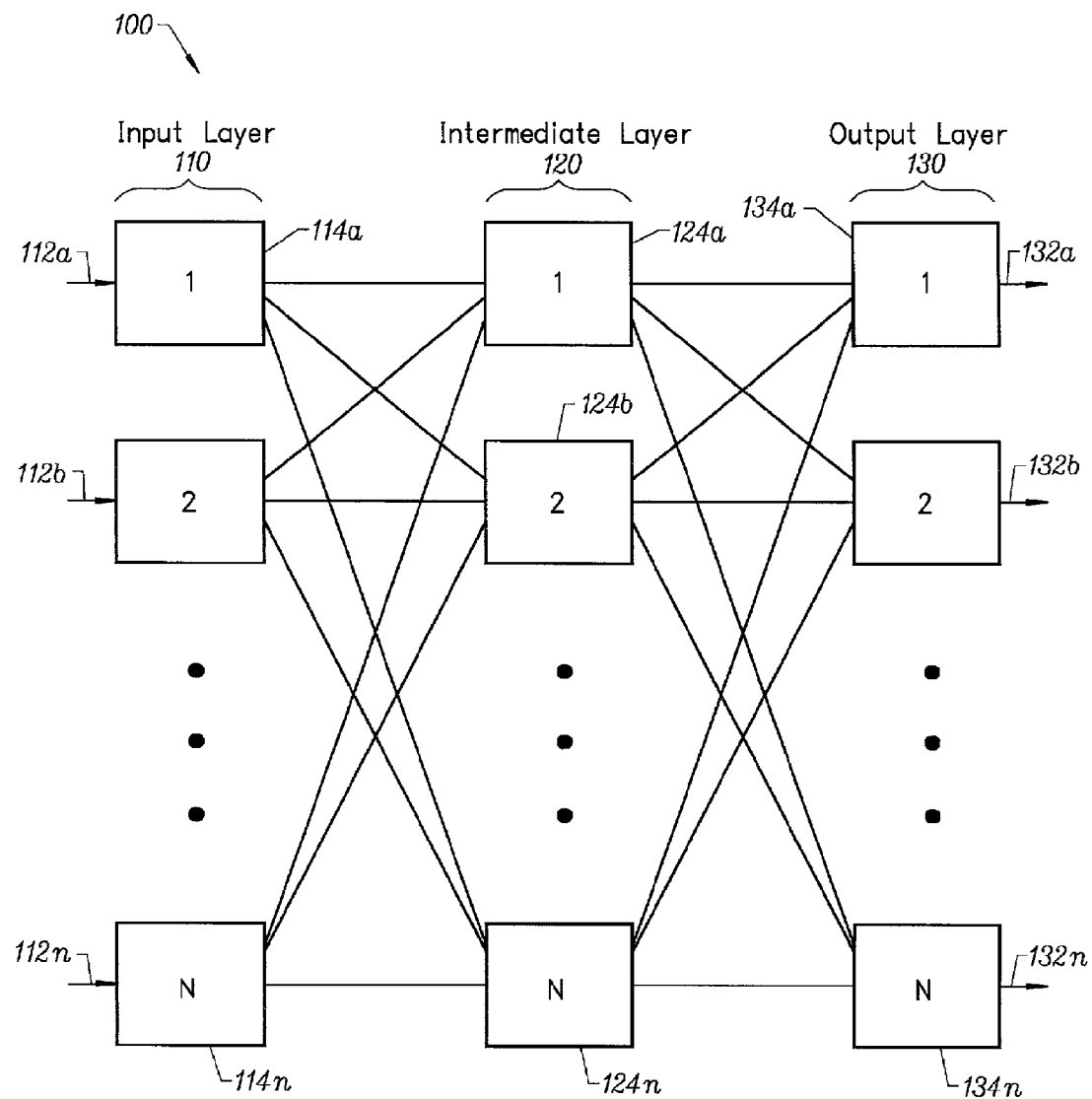
FIG. 1 illustrates a switch according to an embodiment of the invention.

FIG. 1 depicts a network switch 100 according to an embodiment of the invention. The switch 100 includes an input layer 110 that is configured to receive data at the input ports 112a-112n. The data may be in the form of a cell, which is a fixed sized data segment. The data may also be in the form of a packet, which is a variable sized data segment containing many cells. The switch 100 is coupled to line cards in a router. In particular, the input ports 112a-112n are connected to one or more line cards. By way of example, the line cards receive packet data from a number of external sources. The input layer 110 is made up of a number of input layer circuits 114a-114n. The input layer circuits 114a-114n are each respectively coupled to the input ports 112a-112n.

Figure 2:
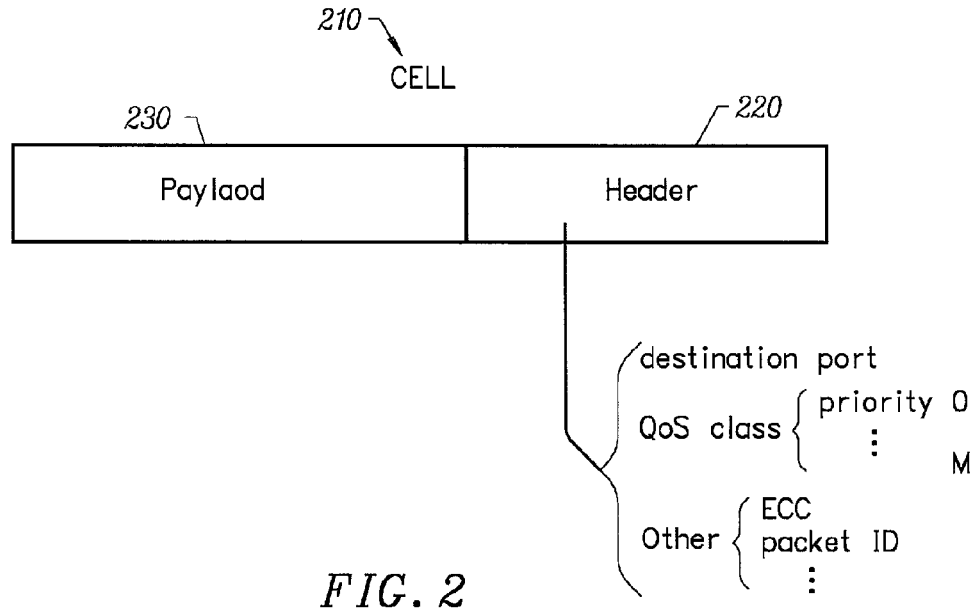
FIG. 2 illustrates an exemplary data cell that is processed in accordance with an embodiment of the invention.

Each input port 112 receives a serial stream of cells. FIG. 2 shows an exemplary cell 210, which includes a header 220 and a payload 230. The header 220 includes attributes of the payload, including the destination port of the switch that the data is intended for and other information. In an exemplary embodiment, the attributes include packet identification, error correction coding, protocol type (i.e., IP, TDM, ATM), and the like. In some aspects of the invention, the attributes include features, such as priority, Quality of Service (QoS), unicast and broadcast, error conditions, and the like.

Figure 3:
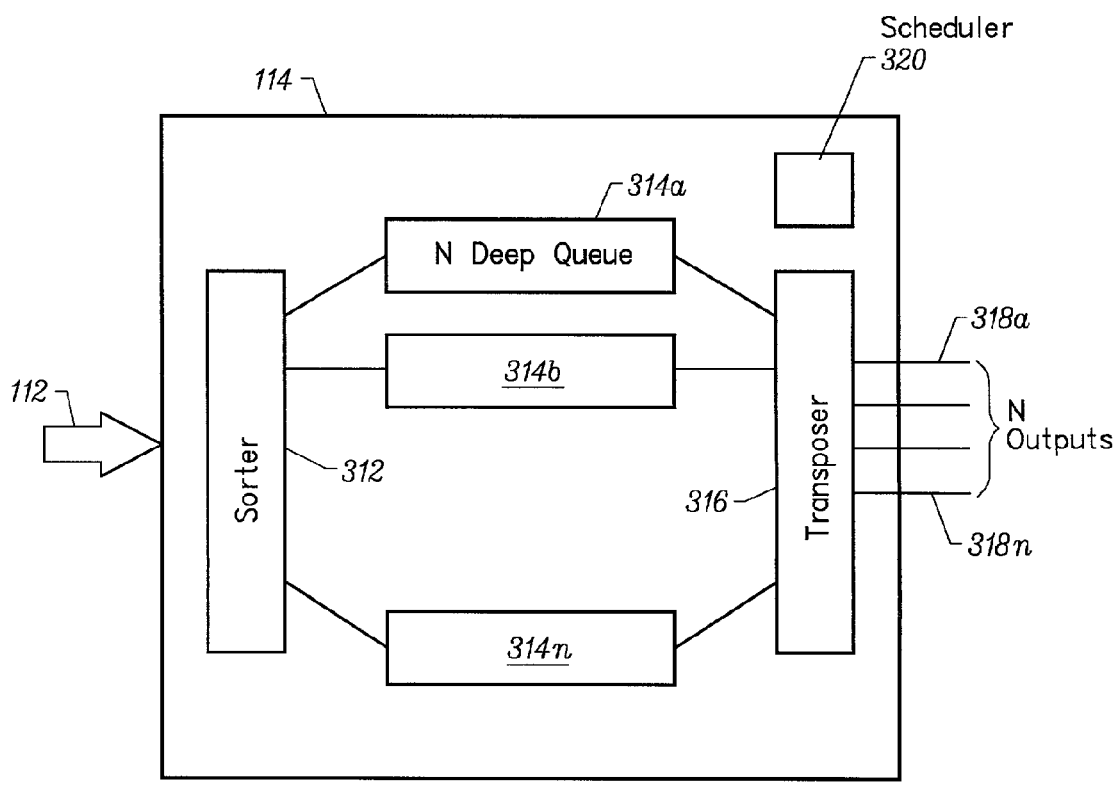
FIG. 3 illustrates an input layer circuit according to an embodiment of the invention.

FIG. 3 illustrates the internal structure of an exemplary input layer circuit 114. The input layer circuit 114 receives a data packet at its input port 112. A sorting circuit 312 processes the cell header of the data packet by decoding its destination. The sorting circuit 312 may be implemented using conventional techniques.

The input layer circuit 114 includes a set of queues 314a-314n. Each queue corresponds to an output destination port. Thus, if there are N output destination ports, N queues are required. Observe that queue 314a corresponds to a first output destination port, queue 314b corresponds to a second output destination port, and so forth. Preferably, each queue 314 holds at least N cells, where N is the number of output destination ports.

As cells are received, the queues 314a-314n are progressively filled. When a queue is full, the queue is transferred to a transposer circuit 316. The transposer circuit receives a serial stream of data packets from a queue 314 and transposes the data packets into a set of parallel data packets that are applied to output ports 318a-318n of the input layer circuit 114. Observe that the input layer circuit 114 receives a serial stream of input data packets and produces a set of parallel output data packets. Each parallel output data packet originates from a single queue, which is used to store data packets intended for a single destination. As discussed below, the parallel output data packets are distributed across a parallel shared memory, which operates to balance the load of incoming data. The parallel output data packets are distributed across the parallel shared memory in regions of the parallel shared memory intended for a single destination, as demonstrated below.

In one embodiment of the invention there are 48 separate queues 114, wherein each queue 114 holds 48 data packets. Full queues are serviced in a round robin manner, as tracked by the scheduler 320. Preferably, the scheduler 320 periodically services non-full queues to avoid unreasonable delays.

Returning to FIG. 1, the data packets from the input layer 110 are delivered, in parallel, to the intermediate layer 120. Like the input layer 110, the intermediate layer 120 is made up of a number of circuits 124a-124n, referred to as intermediate layer circuits.

Figure 4:
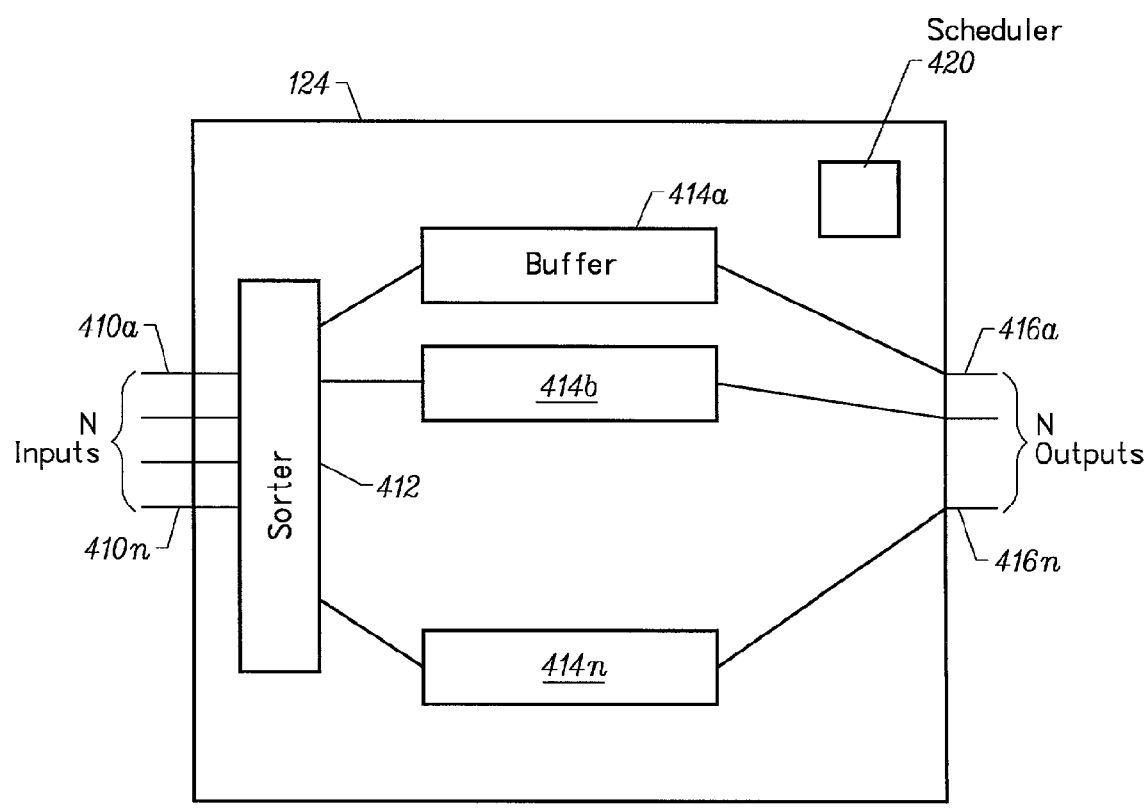
FIG. 4 illustrates an intermediate layer circuit according to an embodiment of the invention.

FIG. 4 depicts the internal structure of an intermediate layer circuit 124. The circuit 124 includes N input terminals 410a-410n coupled to a sorting circuit 412 that is configured to sort the incoming data cells by destination. The sorting circuit 412 is similar to that of the input layer sorting circuit 312. The intermediate layer circuit 124 also includes N buffers 414a-414n to store the incoming data cells. Each buffer 414 has a corresponding output destination. That is, each buffer 414 stores data packets for a single output port. For example, cells destined for output port 1 are stored in buffer 414a, cells destined for output port 2 are stored in buffer 414b and cells destined for output port N are stored in buffer 414n. The buffers 414a-414n are progressively filled as cells are sorted by the sorting circuit 412. However, the buffers 414a-414n differ from the input layer queues in a number of important ways.

First, cells are released from the buffers 414a-414n on a continuous basis. That is, unlike the input layer queue which only releases cells after a queue is filled, the buffers 414 do not wait until they are filled before sending out cells. This ongoing release of cells is not arbitrated or otherwise subject to a centralized control mechanism.

A second distinguishing feature between the input layer and the intermediate layer is that the intermediate layer circuits do not have transposer circuits.

Transposer circuits are not required since the buffers 414 are coupled to terminals that send cells to the output layer as needed.

A third distinguishing feature between the input layer and the intermediate layer is that the input layer circuits have a serial input node and N parallel output nodes, while the intermediate layer circuits have N parallel input nodes and N parallel output nodes.

One embodiment of the invention has 48 buffers 414. The scheduler 420 is used to release cells from the buffers 414 as they arrive. There is no communication between the individual intermediate layer circuits 124. Instead, each intermediate layer circuit 124 observes a strict timing protocol, as discussed below.

Figure 5:
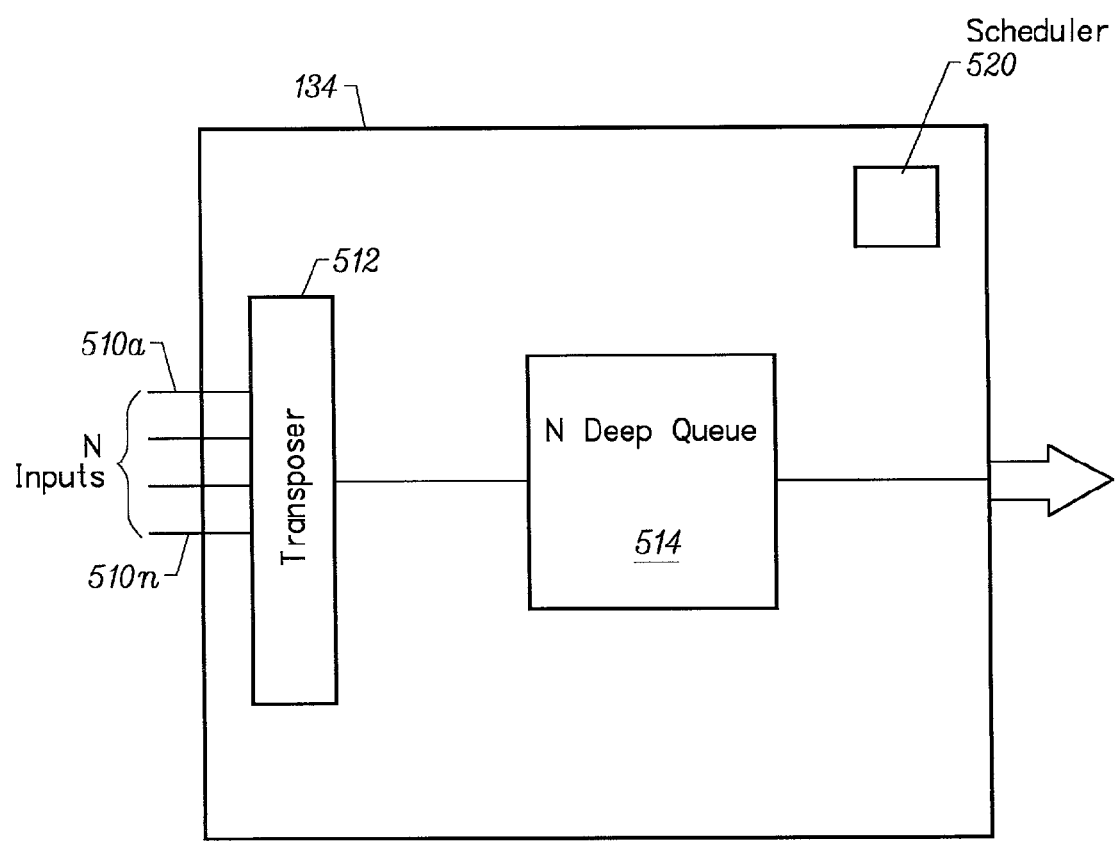
FIG. 5 illustrates an output layer circuit according to an embodiment of the invention.

Returning to FIG. 1, the switch 100 also includes an output layer 130. Like the other layers, the output layer 130 is made up of a number of circuits 134a-134n. FIG. 5 depicts the internal structure of an output layer circuit 134. The circuit includes N input terminals 510a-510n coupled to a transposer circuit 512, which is configured to transpose into a serial data stream data cells received on the N input terminals. Since the output circuit 134 can receive N cells in parallel, the transposer circuit 512 transposes the parallel cells into an N-deep queue 514 so that the cells can be transferred to the destination output port 516 in a serial fashion. This is performed at the direction of a circuit scheduler 520.

Figure 6:
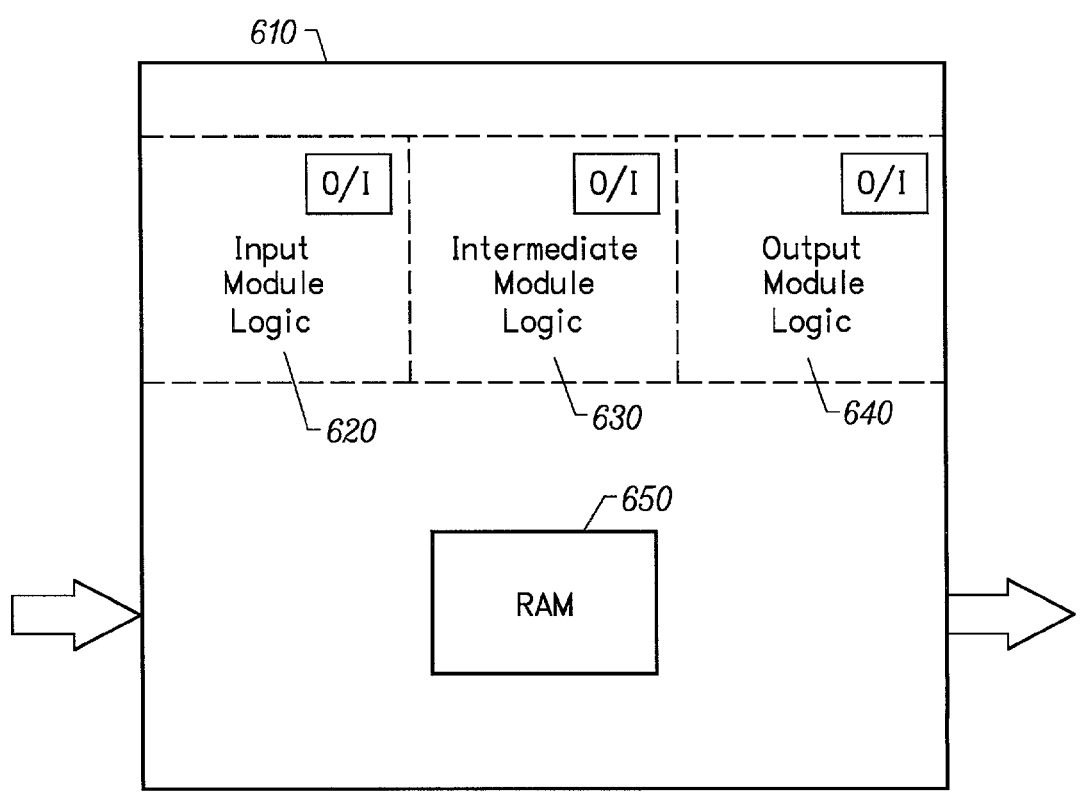
FIG. 6 illustrates an integrated circuit for use in the switch of FIG. 1 according to an embodiment of the invention.

FIG. 6 shows an exemplary integrated circuit 610 for use in the switch 100. Since the architectures of the input layer circuits, intermediate layer circuits and output layer circuits are similar, one aspect of the invention is that the same integrated circuit may be used in each of the layers. The control logic associated with the circuit for that particular layer is enabled and the control logic not associated with the circuit is disabled. The chip 610 includes input layer logic 620, intermediate layer logic 630 and output layer logic 640. The chip also includes a RAM 650 that is controlled by the enabled logic. The RAM 650 is configured to form queues 314, 414 and 514, as shown above. The circuit 610 may be used to implement an input layer by activating the input module logic 620, while deactivating the intermediate module logic 630 and the output module logic 640. Similarly, the circuit 610 may be used to implement an intermediate layer by activating the intermediate module logic 630, while deactivating the input module logic 620 and the output module logic 640. Finally, the circuit 610 may be used to implement an output layer by activating the output module logic 640, while deactivating the input module logic 620 and the intermediate module logic 630. Advantageously, this feature allows the invention to be implemented with a single chip architecture.

Figure 7:
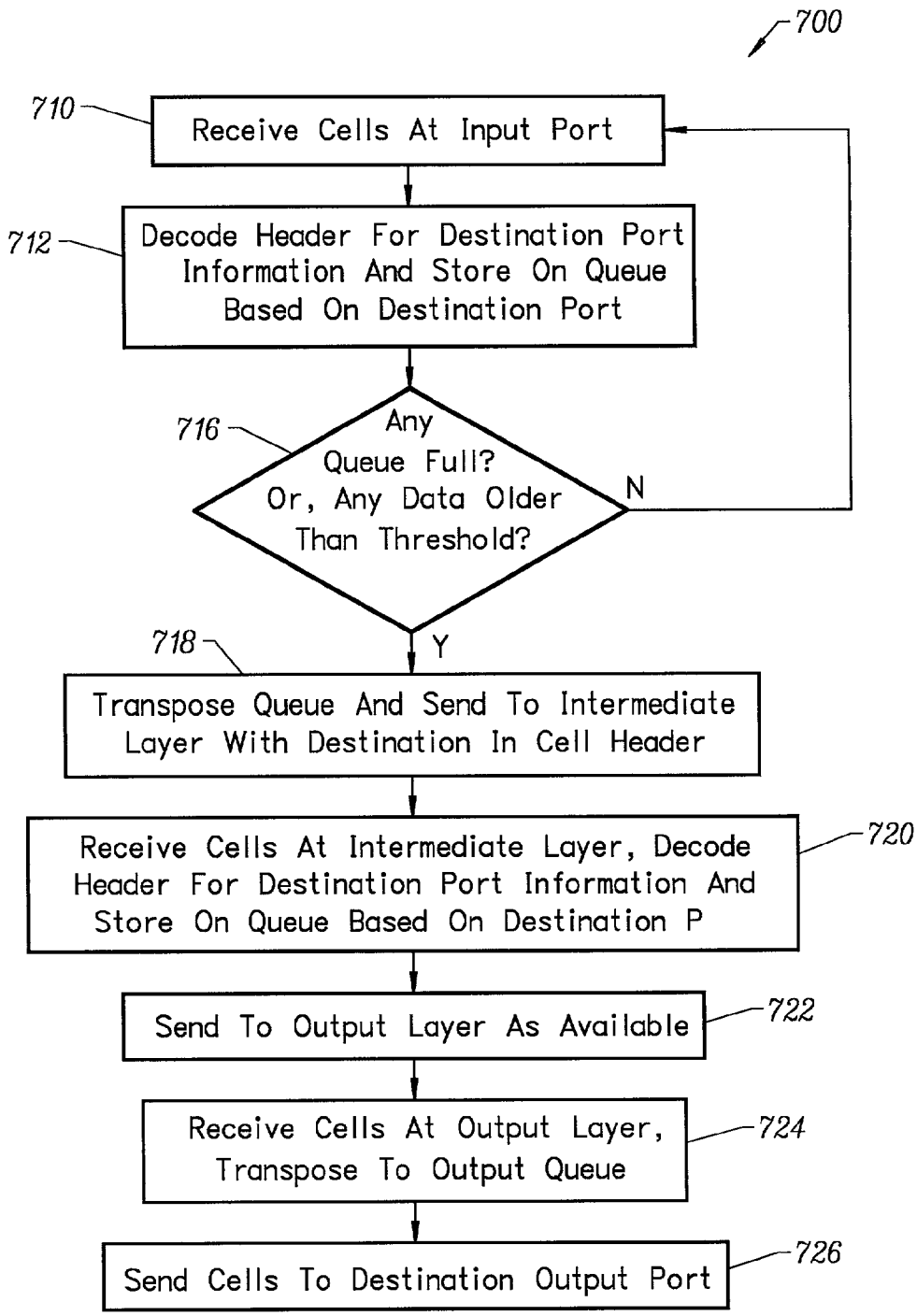
FIG. 7 is a flowchart showing operation of the switch according to an embodiment of the invention.
Figure 8:
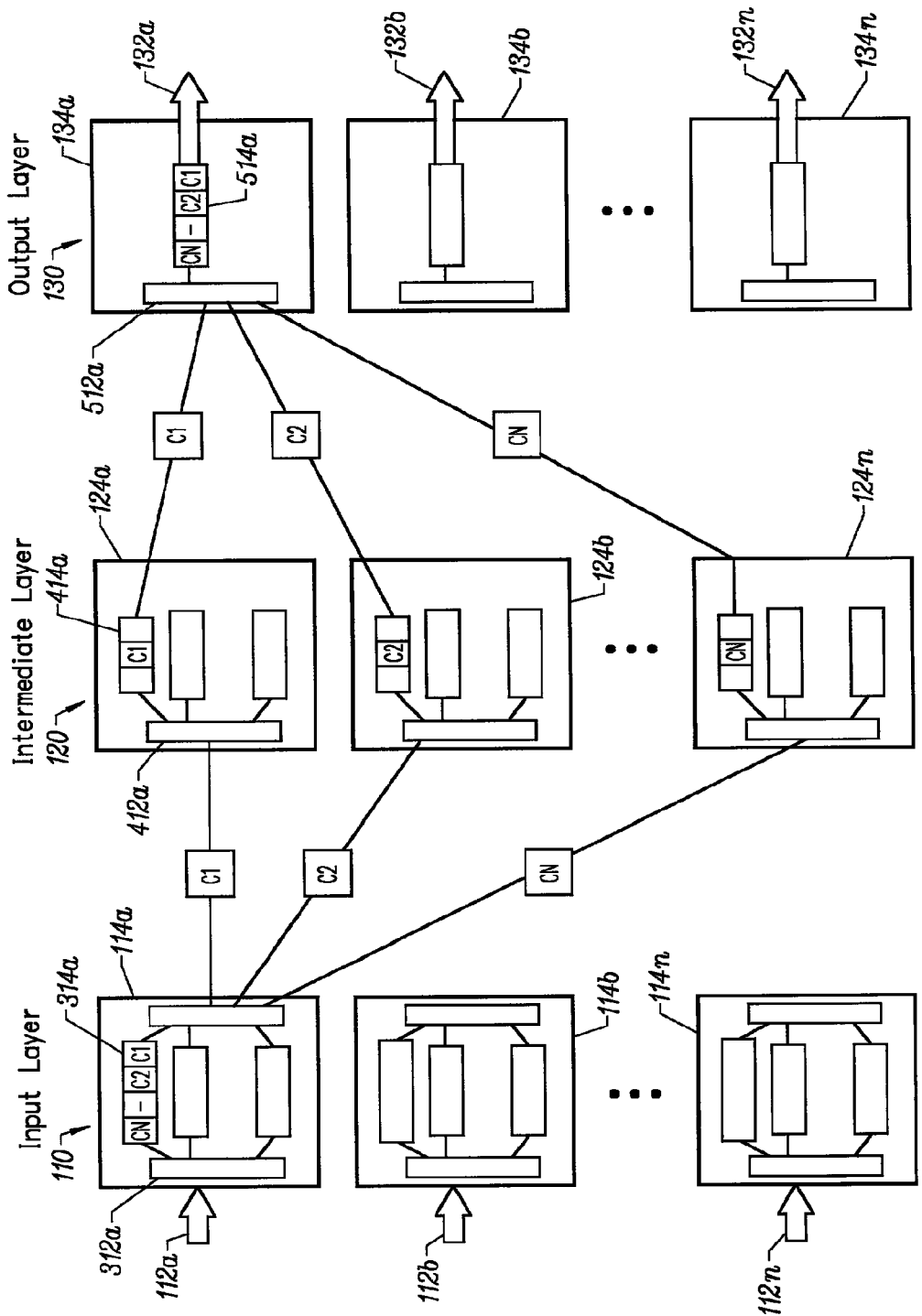
FIG. 8 is a dataflow diagram showing the operation of an embodiment of the invention.
Figure 9:
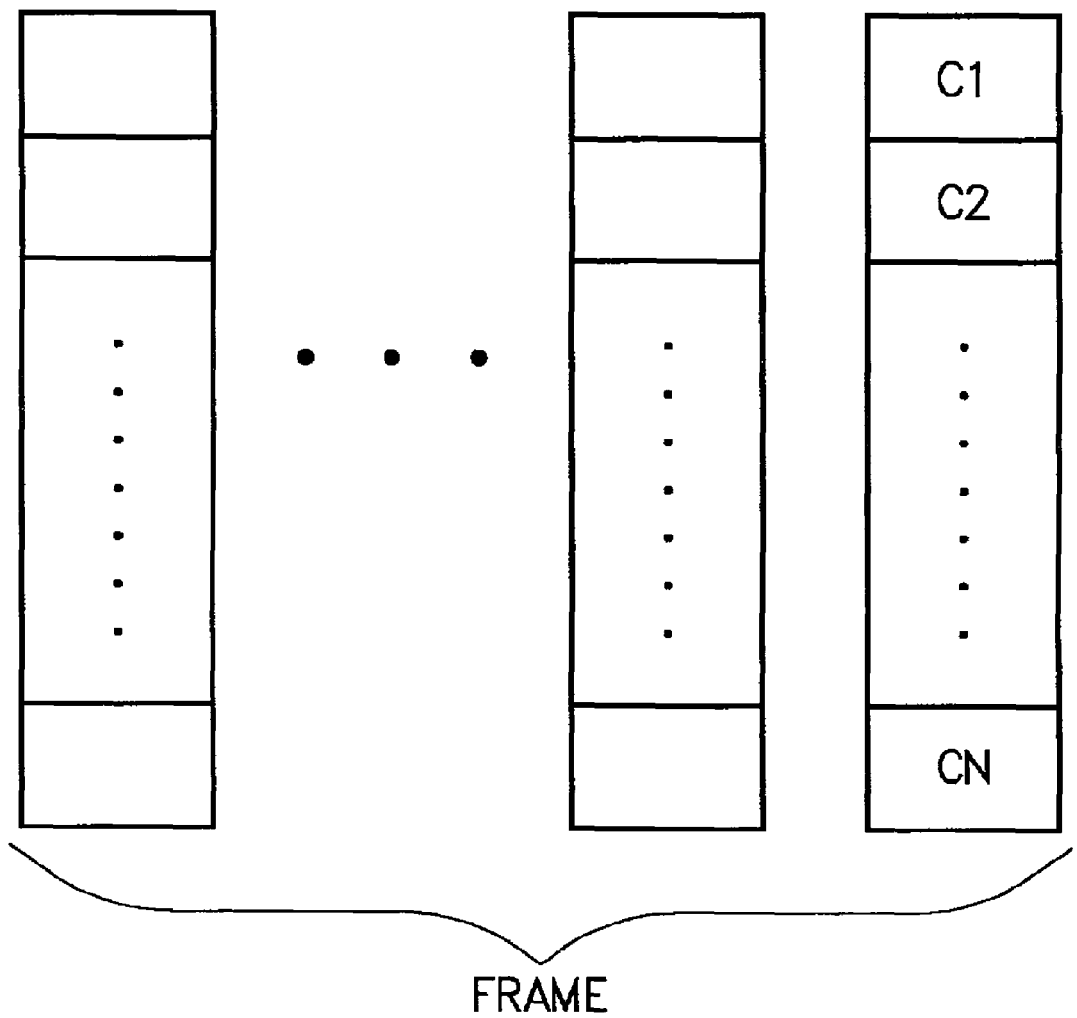
FIG. 9 is a data diagram showing data cells as sent to the intermediate layers for each master frame according to an embodiment of the invention.

FIG. 7 is a flowchart 700 showing operation of the switch 100 according to an embodiment of the invention. An explanation is provided in conjunction with FIG. 8, which is a dataflow diagram showing operation of the switch according to an embodiment of the invention. FIG. 9 illustrates a data diagram showing data cells as sent to the intermediate layers for each master frame in a round robin technique, as discussed in connection with FIG. 7.

The first processing step associated with FIG. 7 is to receive cells at an input port (step 710). For example, a given port 112a receives cells C1-CN that are destined for output port 132a. In step 712, the sorter circuit 312 decodes the cell header and determines that the cells are destined for output port 132a. The sorter circuit 312 stores the cells C1-CN in the input queue 314a, as shown in FIG. 8. In step 716, the input circuit checks the queues to determine if any of them are full, and as an additional possibility, whether the data in any queue is older than a predetermined threshold. This operation may be performed by the scheduler 320. In the case of a non-full queue that is to be serviced, dummy cells are inserted to fill the queue. When the input circuit determines that the queue 314a is full, processing proceeds to step 718. At step 718, the cells are transposed, by the transposer 316, into a set of parallel cells. The cells are then routed to the intermediate layer 120 in parallel. This is accomplished, as shown in FIG. 8, where the cell C1 is sent to intermediate circuit 124a, the cell C2 is sent to intermediate circuit 124b and the cell CN is sent to intermediate circuit 124n.

In step 720, the cells are received by the intermediate layer circuits 124a-124n and each respective sorter circuit 412 decodes the cell headers and determines that the cells are destined for output port 132a. The selector circuit 412 stores the respective cells in the input queue 314a. For example, selector circuit 412a receives and decodes cell C1 and places cell C1 in buffer 414a. The cells are then buffered in parallel as shown in FIG. 8 until they make their way to the output terminals 416 of the intermediate circuits. Observe that the cells are now distributed across a set of intermediate circuits 124. However, in each intermediate circuit, they are stored in a buffer 414 corresponding to the output port to which the cells are destined. In this example, the cells are stored in the first buffer of each intermediate circuit 124.

In step 722, the cells C1-CN are sent to the output layer. Specifically, they are sent to the output circuit 134a because the cells are destined for output port 132a. In step 724, the cells are received by the output layer circuit 134a. The cells are received in parallel and the transposer circuit 512 transposes the cells and stores them in the N-deep queue 514. In step 726, the cells C1-CN are sent out the output port 132a and the switch function is complete.

This procedure continues for the other cells as shown in FIG. 9, which is a data diagram showing data cells as sent to the intermediate layers for each master frame in a round robin technique. In such a technique, all the circuits receive a frame clock in addition to a system clock. Additionally, the circuits are instructed at initialization as to which time slot to use since the assignment of the time slots is arbitrary and can even be assigned based on any identified fault conditions. The round robin technique is an adequate arbitration technique although other techniques may also be used in accordance with the invention.

Figure 10:
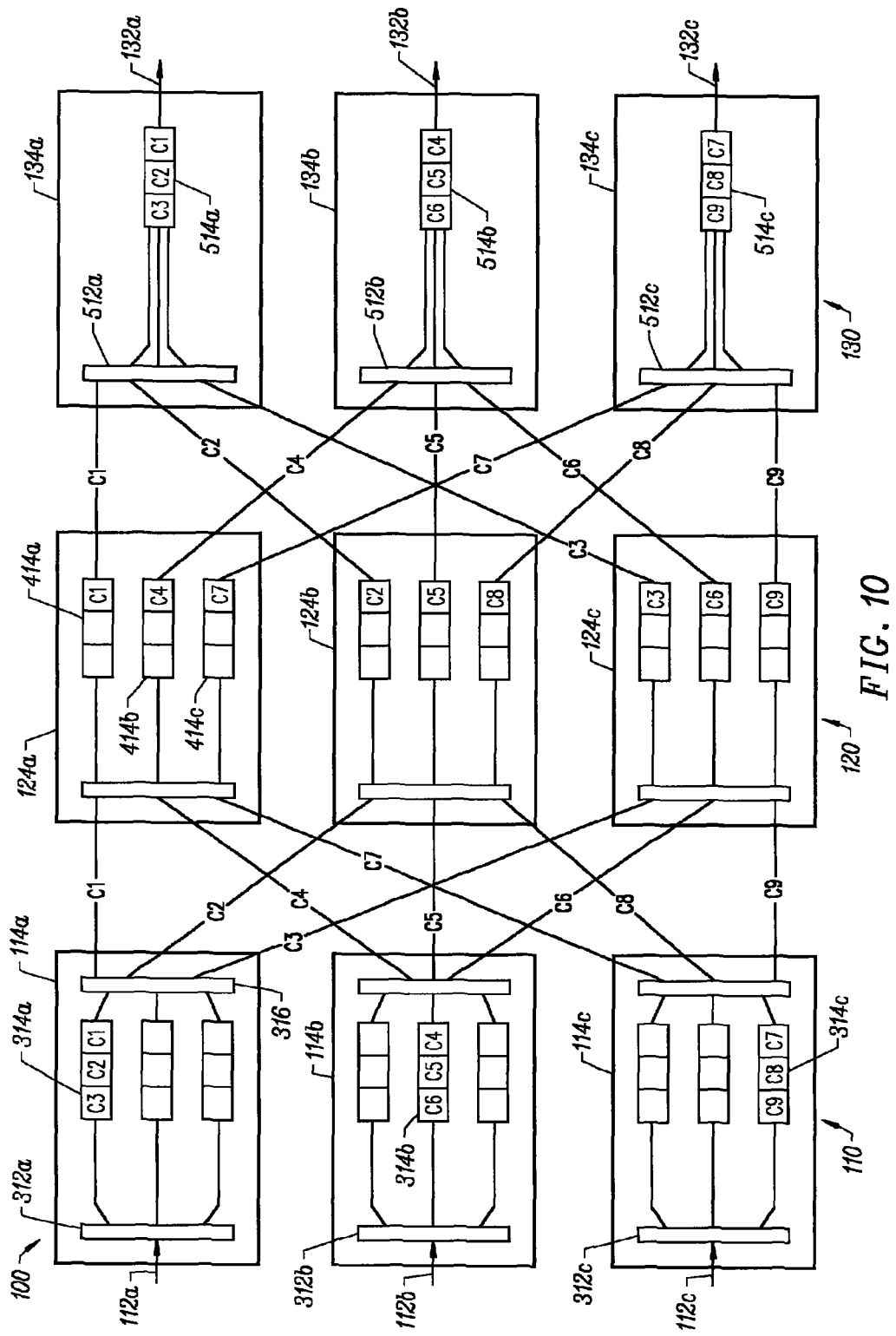
FIG. 10 is a dataflow diagram showing the operation of an embodiment of the invention.

The operation of the invention is more fully appreciated with an additional example. FIG. 10 illustrates a switch 100 with an input layer 110, an intermediate layer 120, and an output layer 130, where each layer 110, 120, and 130 has N=3 circuits. In this example, nine cells (C1-C9) are processed. Observe in FIG. 10 that input layer circuit 114a receives cells C1, C2, and C3. The header of each of these cells indicates that each cell should be routed to a first output port 132a. Accordingly, the sorter 312a places the cells in a first queue 314a, which corresponds to the first output port 132a. In a similar manner, the input layer circuit 114b receives cells C4, C5, and C6. The header of each of these cells indicates that each cell should be routed to a second output port 132. Accordingly, the sorter 312b places the cells in the second queue 314b, which corresponds to the second output port 132b. The cells C7, C8 and C9 are processed by input layer circuit 114c in an analogous manner.

Once a queue 314 of the input layer circuit is full, in this example when three cells arrive, the cells are distributed in parallel to the intermediate layer, as discussed above in connection with the transposer 316. FIG. 10 illustrates cells C1, C2, and C3 being routed in parallel. FIG. 10 also illustrates the remaining cells C4-C9 being routed in parallel to the intermediate layer 120. This results in the intermediate layer 120 storing cells destined for each output port. For example, intermediate layer circuit 124a stores cell C1 destined for the first output port 132a in a first queue 414a. Cell C4, destined for the second output port 132b is stored in the second queue 414b, while cell C7, destined for the third output port 132c is stored in the third queue 414c. The cells stored by intermediate layer circuit 124a were received by three different input layer circuits and will be routed to three different output layer circuits. Thus, this example helps illustrate the load balancing operation performed by the intermediate layer 120.

Each intermediate layer circuit delivers cells to the output layer 130 as the cells arrive. Thus, FIG. 10 illustrates that intermediate layer circuit 124a sends cell C1 to output layer circuit 134a, cell C4 is sent to output layer circuit 134b and cell C7 is sent to output layer circuit 134c. Similarly, intermediate layer circuit 124b sends cell C2 to output layer circuit 134a, cell C5 is sent to output layer circuit 134b and cell C8 is sent to output layer circuit 134c. Each output layer circuit 134 receives cells in parallel and loads them into a queue 514, as shown in FIG. 10. Queue 514a of output layer circuit 134a stores the cells C1, C2 and C3 destined for output port 132a. Queue 514b of output layer circuit 134b stores the cells C4, C5 and C6 destined for output port 132b. Finally, queue 514c of output layer circuit 134c stores the cells C7, C8 and C9 destined for output ports 132c.

The operation of the invention has now been fully described; attention presently turns to a discussion of various features and benefits associated with the invention. The invention achieves flow control through back-pressure feedback. Back-pressure feedback relies upon downstream conditions (e.g., a blocked queue at an output port) to alter a data header of an upstream cell (e.g., the data header for a cell at the input layer 110). The subsequent flow of the upstream cell is then processed in accordance with the downstream information. This technique is more fully appreciated in connection with FIG. 11.

Figure 11:
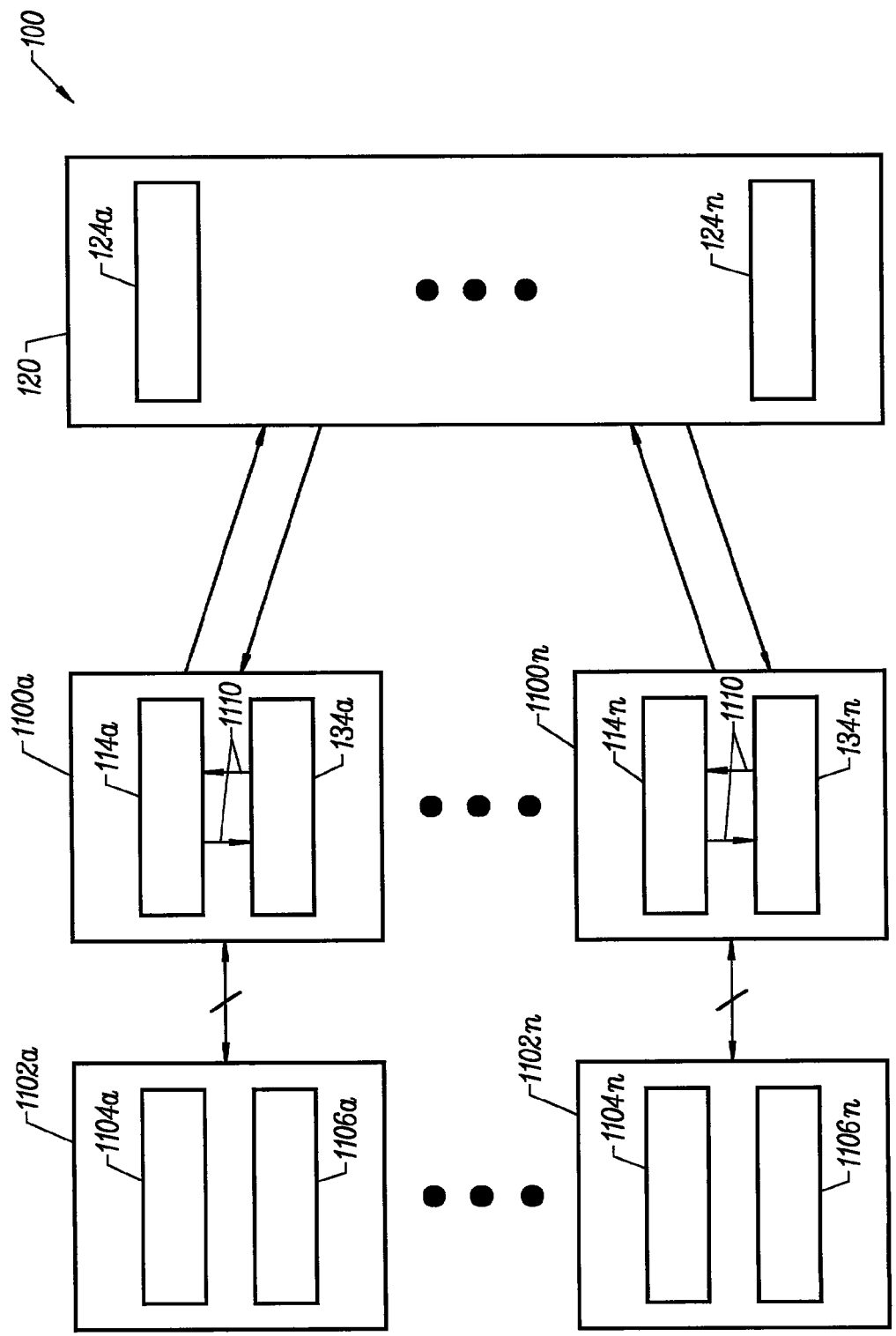
FIG. 11 illustrates an embodiment of the invention wherein the input layer and output layer are distributed across a set of shared modules.

FIG. 11 illustrates the switch 100 of the invention in a slightly different form. In FIG. 11, the input layer circuits 114a-114n of the input layer are distributed across a set of port cards 1100a-1100n. The port cards 1100a-1100n also include the output layer circuits 134a-134n. In this configuration, a port card, say port card 1100a, has an input layer circuit 114a and a corresponding output layer circuit 134a. Electrical leads 1110 between an input layer circuit 114a and a corresponding output layer circuit 134a allow information to be conveniently passed between the output layer and the input layer.

FIG. 11 also illustrates a set of prior art line cards 1102a-1102N connected to the port cards 1100a-1100n. Each line card 1102 includes an ingress queue 1104 and an egress queue 1106.

The circuit topology of FIG. 11 allows for the output layer to relay information back to the input layer regarding conditions in the switch 100. For example, the output layer can count the depth of each of its queues and provide a signal to the input layer identifying which of its queues are above a threshold congestion position. This signal can be generated by the scheduler 520 associated with each output layer circuit 134. This back-pressure signal can be handled within the switch. For example, the signal can be received by the scheduler 320 of an input layer circuit 114. In this example, the scheduler 320 instructs the sorter 312 to toggle a ready bit in the cell header. In this way, the ready bit can be used to convey inter-layer flow control information. Alternately, the back-pressure signal can be sent to one or more line cards 1102. In this embodiment, one or more line cards respond to the signal by only releasing high priority data destined for the output port experiencing congestion.

There are many variations on the foregoing technique. For example, when the free cell pointer of output module 134a is running low, the output module 134a can signal all of the intermediate layer circuits 124a-124n to stop sending traffic to the output module 134a. This can be done with a one bit signal applied to the input layer circuit 114a on the same port card 1100a. The input module circuit 114a responds to the one bit signal by de-asserting the ready bit in all cells departing for the intermediate layer circuits 124. The intermediate layer can identify the congested output module by observing which input layer circuit 114a is de-asserting the ready bit. Based upon this information, the intermediate layer stops transmitting cells to the congested output module 134a.

The switch of the invention can also be configured to support various levels of quality of service (QoS). Quality of service is a noteworthy aspect of the invention since some forms of data (e.g., voice) frequently take priority over other forms of data (e.g., e-mail). In one embodiment of the invention, the cell header includes an attribute to assign the cell to a particular priority level. In such a case, a QoS attribute would be present in the header, as shown in FIG. 2. If the priority is high, then the cell is processed through the switch 100 in an expeditious manner. One way this can be accomplished is by selecting queues 314 at the input layer 110 that meet a particular threshold. For example, suppose a queue has a number j of high priority cells, in view of this number of high priority cells, the cells of the queue are released, even if the queue is not full. This expedites the processing of high priority cells. This may not be the most efficient way to handle the cells, but there is a trade-off between handling the high priority cells versus maximizing the performance of the switch. This is particularly true when a majority of the cells are low priority cells. In such a case, the lost performance may be negligible, while the enjoyment of the sound or video quality to the user is maintained.

Other techniques may also be used to implement quality of service provisions. For example, the intermediate layer 120 can count the depth of each of its queues 414 and report to the output layer 130 which of its queues are above a threshold position. The intermediate layer could also report quality of service parameters for the queued data. This can be a factor in generating a back-pressure signal that can be handled at other layers of the switch or sent to the line cards 1102. The line card would respond to the signal by sending only high priority data through the switch destined for the output port experiencing congestion.

The architecture of the invention results in fault-tolerant operation. Observe that the input layer 110 includes a set of input layer circuits 114, the intermediate layer 120 includes a set of intermediate layer circuits 124, and the output layer 130 includes a set of output layer circuits 134. This architectural redundancy results in distributed processing without a critical central failing point. In the case of the failure of a component of the invention, there is a degradation in performance, but not a catastrophic failure. For example, in the case of the failure of an intermediate layer circuit, there are still N−1 intermediate layer circuits available to process traffic.

Fault tolerance is incorporated into the switch using a number of techniques. For example, the line cards can have primary and secondary contacts to the input layer. Referring to FIG. 11, line card 1102a can be configured to include contacts to input port card 1100a and an adjacent input port card (e.g., input port card 1100b, which is not shown for the sake of simplicity). If one set of contacts fail, the line card transfers data cells to the secondary contact. This feature provides fault tolerance at the input layer 110.

When the failure is in the intermediate layer 120, the input queues in the input circuits can be reduced (e.g. to N−1) and the failed intermediate layer circuit can thereby be avoided, as previously indicated. Since N is an arbitrary number, the reduction in the available intermediate layer circuits can be handled gracefully by reducing the input queue depth by one on-the-fly without an interruption in packet processing. Finally, when the failure is in the output circuit, the output port can be flagged as disabled and the cells are routed to a different output port and the router adjusts its routing functions to accommodate the failure. In each of these cases, the performance is simply degraded and flagged, but does not result in overall switch failure.

The examples of the invention provided up to this point have been directed toward unicast packet communication. A unicast packet has one source and one destination. The switch 100 can also be used to implement multicast packet communication. In multicast packet communication, a packet has one source and multiple destinations.

Multicast packet communication can be implemented with cell header information. For example, the cell header can include a bit map specifying a set of destinations for a single cell. Preferably, the input layer circuits 114 identify whether an incoming cell is a multicast cell. The input layer circuits 114 would typically assign a relatively low priority to multicast cells. At the intermediate layer 120, each intermediate layer circuit 124a is preferably configured to read the cell header for multicast attributes, replicate cells and store them in multiple buffers 414. This operation can be implemented with the sorter 312 and scheduler 320. This causes the replicated cells to be sent to multiple output circuits 134, resulting in a multicast message. In one embodiment of the invention, each output layer circuit 134 is configured to make copies of multicast cells where required for multiple egress line cards. This operation can be implemented using the sorter 412 and scheduler 420.

The switch 100 is also configurable to support Time-Division Multiplexed (TDM) and Asynchronous Transfer Mode (ATM) or other protocol traffic. That is, the switch 100 can be configured to switch and route digital telephony signals, which cannot be delayed (i.e., they must be processed with a very high priority within the switch). For example, in one embodiment of the invention, a particular output layer circuit, say 134a, is devoted to carrying TDM traffic. This output layer circuit has a corresponding dedicated intermediate layer circuit, say 124a, to instantaneously route traffic to the output layer circuit. If the designated output layer circuit and intermediate layer circuits are underutilized, they can be used to carry best efforts traffic. Alternately, the intermediate layer 120 can be time-divided to carry TDM traffic.

In the exemplary embodiment, the intermediate layer 120 operates without timing signals between the individual intermediate layer circuits 124. Instead, the intermediate layer circuits 124 are initialized to a synchronized state. In particular, a training sequence is applied to each of the input layer circuits 114. The training sequence arrives within a window of time bounded by a link skew signal and a synchronization skew signal. The intermediate layer 120 then waits until the training sequence is received from the input layer circuits 114. The bias points for the different buffers 414 are then noted and are subsequently utilized as cells are received in normal operation. The bias point data insures that the intermediate layer circuits operate in an identical state.

The parallel-shared memory output queue architecture of the invention has a number of benefits. For example, the invention has a large aggregate bandwidth, yet can be implemented with relatively low chip counts, which results in lower cost and power consumption. The relatively simple design of the invention avoids a centralized arbiter mechanism or other type of complicated scheduler.

Those skilled in the art will recognize any number of variations on the base architecture described in this document. For example, the input layer circuits may be implemented to include a number of queues 314 for each destination port. Each queue can then be assigned a different priority to receive traffic with a corresponding priority. Similarly, each output layer circuit can include a set of output layer queues associated with different channels and classes of services.

The invention has been described including the best mode known of practicing the invention. Those skilled in the art will recognize that modifications can be make to the invention while remaining within the claims defined below.

The invention claimed is:

1. A method of routing data packets, comprising;
   receiving a serial data stream with a set of cells, each cell including data and a header designating a respective destination port that the data is intended for, at a first input layer port of a first input layer circuit, said first input layer circuit being a part of an input layer comprising a plurality of input layer circuits, each input layer circuit comprising a sorting circuit and a plurality of queues, each queue corresponding to a destination port in a one to one correspondence;
   routing a first cell of said set of cells, said first cell having a header designating a first destination port, to a first queue of said first input layer circuit corresponding to said first destination port;
   routing said first cell from said first queue to a first intermediate layer circuit of an intermediate layer comprising a plurality of intermediate layer circuits, each intermediate layer circuit comprising a sorting circuit and a plurality of buffers, each buffer corresponding to a destination port in a one to one correspondence,
   assigning said first cell to a first buffer of said first intermediate layer circuit, said first buffer corresponding to said first destination port; and
   routing said first cell from said first buffer to a first output layer circuit of an output layer, said first output layer comprising said first destination port, said output layer comprising a plurality of output layer circuits, each output layer circuit comprising a destination port in a one to one correspondence.

2. The method of claim 1, wherein, said step of routing said first cell from said first queue to a first intermediate layer circuit is initiated when said first queue is filled with a predetermined number of cells.

3. The method of claim 2, wherein said predetermined number is based upon criteria selected from the group consisting of: a fixed number, input queue size, whether any cell in a queue is older than a predetermined threshold, cell header information, priority of a cell, status of a queue of the output layer, and quality of service data.

4. The method of claim 1, wherein said step of routing said first cell from said first queue to a first intermediate layer circuit of an intermediate layer comprising a plurality of intermediate layer circuits comprises transposing a queue of a plurality of serially received cells in said first queue, including said first cell, into a parallel format and routing each of said plurality of serially received cells in parallel to a different one of said plurality of intermediate layer circuits, each intermediate layer circuit assigning the respective cell routed to it to a buffer corresponding to the respective destination port of the respective cell.

5. The method of claim 4, wherein said step of routing said first cell from said first buffer to a first output layer circuit further comprises routing each of the plurality of cells in the respective buffers to a respective output layer circuit of said output layer without reading said header designating the respective destination port of each cell, the respective output layer circuit comprising the respective destination port for each respective cell routed to it.

6. The method of claim 5, further comprising the step of:
   transposing, at said respective output layer circuits, said cells routed to said respective output layer circuits, from a parallel format to a serial format, prior to delivering said cells to the respective destination port.

7. The method of claim 1, wherein said step of routing said first cell from said first buffer to a first output layer circuit of an output layer is performed without referencing said header designating said first destination port.

8. The method of claim 1, further comprising the step of:
   duplicating said first cell when said header of said first cell specifies that said first cell is a multicast cell.

9. The method of claim 1, further comprising the step of:
   routing said first cell to a dedicated high priority traffic intermediate layer circuit if said header of said first cell specifies that said first cell has a high priority.

10. The method of claim 1, wherein said input layer, said intermediate layer, and said output layer are formed on a single semiconductor substrate.

11. A switch for routing data, comprising:
    an input layer including a plurality of input layer circuits, each input layer circuit including an input layer circuit input port and a plurality of queues corresponding to a plurality of destination ports in a one to one correspondence, Wherein each input layer circuit is configured to:
       receive a serial data stream with a set of cells, each cell including data and a header designating a respective destination port for said data;

route each cell to a respective queue corresponding to the respective destination port for each cell; and route each cell from its respective queue to a buffer in an intermediate layer circuit corresponding to the respective destination port for each cell;

an intermediate layer including a plurality of intermediate layer circuits, each intermediate layer circuit including a plurality of buffers, each buffer corresponding to one of said destination ports in a one to one correspondence, each intermediate layer circuit operably coupled to said input layer circuit and a plurality of output layer circuits, wherein each intermediate layer circuit is configured to;

assign each cell received from a queue to a respective buffer of said plurality of buffers corresponding to the respective destination port of each cell; and route each cell from its respective buffer to a respective output layer circuit corresponding to the respective destination port of each cell; and an output layer including a plurality of output layer circuits, each output layer circuit including a single destination port.

12. The switch of claim 11, wherein each input layer circuit further comprises:

a sorting circuit for routing incoming cells to a respective queue corresponding to the respective destination port for each cell; and a transposer circuit configured to transpose a queue of a plurality of serially received cells in one of said queues into a parallel format and routing each of said plurality of serially received cells in parallel to a different one of said plurality of intermediate layer circuits.

13. The switch of claim 11, wherein each output layer circuit further comprises:

a transposer configured to transpose said cells routed to said respective output layer circuits, from a parallel format to a serial format, prior to delivering said cells to the respective destination port; and an output layer circuit queue coupled to the transposer circuit and the destination port.

14. The switch of claim 11, wherein each intermediate layer circuit is configured to assign each cell received from a queue to a respective buffer of said plurality of buffers corresponding to the respective destination port of each cell without referencing said header designating said first destination port.

15. The switch of claim 11, wherein the switch is configured such that a stop of routing each cell from its respective queue to a buffer an intermediate layer circuit corresponding to the respective destination port for each cell is initiated when the respective queue reaches a specified volume level.

16. The switch of claim 15, wherein said specified volume is based upon criteria selected from the group consisting of: a fixed number, input queue size, whether any cell in a queue is older than a predetermined threshold, cell header information, priority of a cell, status of a queue of the output layer, and quality of service data.

17. The switch of claim 11, wherein the switch is configured to duplicate a cell when the header of such cell specifies that the cell is a multicast cell.

18. The switch of claim 11, wherein said input layer, said intermediate layer, and said output layer are formed on a single semiconductor substrate.

19. The switch of claim 11, wherein the switch is configured to route a cell from its respective queue to a buffer of an intermediate layer circuit, wherein the intermediate layer circuit is an intermediate layer circuit that remains operative after one or more of the intermediate layer circuits becomes inoperative.

20. The switch of claim 12, wherein each output layer circuit further comprises:

a transposer configured to transpose said cells routed to said respective output layer circuits, from a parallel format to a serial format, prior to delivering said cells to the respective destination port; and an output layer circuit queue coupled to the transposer circuit and the destination port.

* * * * *